United States Patent [19]
Naumann et al.

[11] Patent Number: 6,069,100
[45] Date of Patent: May 30, 2000

[54] GLASS FOR LAMB BULBS CAPABLE OF WITHSTANDING HIGH TEMPERATURES

[75] Inventors: Karin Naumann, Ober-Olm; Franz Ott, Mitterteich; Otmar Becker, Langen, all of Germany

[73] Assignee: Schott Glas, Mainz, Germany

[21] Appl. No.: 09/178,665

[22] Filed: Oct. 26, 1998

[30] Foreign Application Priority Data

Oct. 27, 1997 [DE] Germany .......................... 197 47 355
Jul. 1, 1998 [DE] Germany .......................... 197 58 481

[51] Int. Cl.$^7$ .................................................. C03C 3/093
[52] U.S. Cl. ................................. 501/67; 501/57; 501/64; 501/70
[58] Field of Search ................................. 501/57, 64, 67, 501/70; 313/636

[56] References Cited

U.S. PATENT DOCUMENTS

| | | |
|---|---|---|
| 3,310,413 | 3/1967 | Harrington . |
| 3,496,401 | 2/1970 | Dambaugh, Jr. . |
| 3,961,970 | 6/1976 | Morgan . |
| 3,978,362 | 8/1976 | Dumbaugh, Jr. et al. . |
| 4,060,423 | 11/1977 | Thomas . |
| 4,163,171 | 7/1979 | Wurster . |
| 4,298,388 | 11/1981 | Sack . |
| 4,737,685 | 4/1988 | Thomas . |
| 5,473,226 | 12/1995 | Beschle et al. . |
| 5,489,558 | 2/1996 | Moffatt et al. . |
| 5,508,237 | 4/1996 | Moffatt et al. . |

FOREIGN PATENT DOCUMENTS

| | | |
|---|---|---|
| 0261819 | 3/1988 | European Pat. Off. . |
| 0638526 | 2/1995 | European Pat. Off. . |
| 0672629 | 9/1995 | European Pat. Off. . |
| 2930249 | 2/1980 | Germany . |
| 3305587 | 9/1983 | Germany . |
| 3736887 | 6/1988 | Germany . |
| WO 99/14794 | 3/1999 | WIPO . |

OTHER PUBLICATIONS

"Technische Gläser" by Schott, Product Information No. 40001 d, 1988. No Month.

"Auer–Remy" Product Information, Cerkoncentrat, 1991. No Month.

"Rohstoffe der Glasindustrie" by J. Lange, 3rd edition, Deutscher Verlag für Grundstoffindustrie, 1993. No Month.

*Primary Examiner*—Karl Group
*Attorney, Agent, or Firm*—Walter Ottesen

[57] ABSTRACT

The invention is directed to an aluminosilicate glass containing alkaline earth metals for lamp bulbs which have molybdenum components and bulb temperatures of greater than 650° C. The glass has a composition in percent by weight on oxide basis as follows: $SiO_2$>58–62; $Al_2O_3$ 15–17.5; $B_2O_3$ 0.2–0.7; MgO 0–<1; CaO 5.5–14; SrO 0–8; BaO 6–10; ZrO 0.05–1.0; $CeO_2$ 0–0.3; $TiO_2$ 0–0.5; Br$^-$ 0–0.6 where Σ RO 21–24; (MgO+CaO+SrO)/BaO 1.45–1.75; and an alkali metal content of <0.03% by weight and a water content of <0.02% by weight.

8 Claims, No Drawings

GLASS FOR LAMB BULBS CAPABLE OF WITHSTANDING HIGH TEMPERATURES

FIELD OF THE INVENTION

The invention relates to an earth-alkaline aluminosilicate glass for lamp bulbs which have molybdenum components and with bulb temperatures of greater than 650° C.

BACKGROUND OF THE INVENTION

High demands are placed on glasses for high-temperature lamps, which are generally understood to mean lamps having bulb temperatures of above 550° C.

The glasses in question are alumino(boro)silicate glasses which contain alkaline earth metals. The glasses must be essentially free of alkali metal oxides, since alkali metal ions interfere with the regenerative halogen cycle in the lamp. This is because, during operation of the lamp, the tungsten vapor from the filament and the halogen/inert gas mixture form an equilibrium between formation and decomposition of tungsten halides, the decomposition reaction taking place at higher temperatures than the formation reaction, so that the tungsten is deposited back on the filament. If this cycle is interfered with by contaminating components, such as for example alkali metal ions, the tungsten is deposited not on the filament but on the inside of the glass bulb, as an undesirable shiny black disruptive coating.

The patent literature already contains numerous documents which relate to glasses for incandescent lamps. However, these glasses are afflicted with a very wide range of drawbacks.

U.S. Pat. No. 3,978,362 describes incandescent lamps with lamp bulbs made from glass which has a high CaO content (14–21% by weight).

German patent publication 3,736,887 describes incandescent lamps made from glass bulbs which have a high BaO content (10–23% by weight).

Other documents claim glasses which have specific ratios between CaO and BaO.

German patent publication 2,733,169 relates to glasses for seals with molybdenum in which the CaO : BaO weight ratio is between 0.6 and 1. These glasses are $B_2O_3$-free.

German patent publication 2,930,249 relates to the use of specific glass compositions as bulb material, in which compositions the BaO:CaO weight ratio is between 2.3 and 3.5 (CaO:BaO between 0.28 and 0.43). The glasses described in the latter document are said to have an improved resistance to what is known as "reboil". Reboil is the tendency of the glass to form a large number of small bubbles of included gases when subjected to further processing with a flame or when reheated. This impairs the light transmission and weakens the reheated areas.

A drawback of the glasses which have very high BaO contents are the high melting and working temperatures, which lead to increased stress on the tank furnace material and entail high power costs, while the glasses which have high CaO contents have a greater tendency towards crystallization and a higher expansion coefficient compared to those which have a high BaO content.

U.S. Pat. No. 4,060,423 describes $B_2O_3$-free glasses for Mo seals in which the $Al_2O_3/(BaO+CaO)$ weight ratio lies in the range from 0.6 to 1.

U.S. Pat. No. 4,298,388 also describes $B_2O_3$-free glasses for glass-Mo seals. These glasses are also MgO-free and have high CaO contents (up to 19.2% by weight). BaO is only an optional component.

Although the $B_2O_3$-free glasses, at least if they contain little or no MgO, have sufficient thermal stability, as is evidenced, for example, by high softening temperatures and high strain points, and in principal also allow bulb temperatures of up to 700° C., they are subject to the drawback that they have to be melted at high temperatures. The associated high level of corrosion to the tank blocks and the crown material to some extent leads to poor quality of the glass and to an increase in the impurity level, which means that such a glass is not particularly suitable for use as a bulb material, since increasing levels of impurities may lead to a higher level of black discoloration in the lamp.

Glasses which require large quantities of $B_2O_3$ for incandescent lamp bulbs are also known. For example, the glasses for seals with molybdenum described in U.S. Pat. No. 3,310,413 contain 4 to 9% by weight of $B_2O_3$. The sealing or bulb glasses described in DE 33 05 587 A1 also require 3 to 7% by weight of $B_2O_3$ and, moreover, high BaO contents (11–16% by weight). Such high $B_2O_3$ contents, in particular in combination with MgO, reduce the viscosity values, so that these glasses are unsuitable for halogen lamps with bulb temperatures of greater than 650° C., for example of approx. 700° C. The low stability of the glasses at high temperatures leads to the lamp bulb bulging, possibly even to such an extent that the bulb will explode. One example of such a glass is the commercially available glass V1, having the composition (in % by weight) 56.8 $SiO_2$; 16.4 $Al_2O_3$; 4.7 $B_2O_3$; 5.8 MgO; 7.8 CaO; 8.0 BaO, with an annealing point AP of 721° C.

U.S. Pat. No. 3,496,401 describes incandescent lamps made from an aluminosilicate glass containing alkaline earth metals and having a maximum alkali metal oxide content of 0.1% by weight, in particular made from glasses comprising $SiO_2$, $Al_2O_3$, 10–25% by weight of alkaline-earth metal oxides, the specific levels of which are not given in further detail, and 0–10% by weight of $B_2O_3$. The exemplary embodiments are either $B_2O_3$-free or contain at least 4% by weight of $B_2O_3$. The maximum permissible alkali metal oxide content is too high for the high bulb temperatures of approx. 700° C. and, during operation of the lamp, will lead to blackening of the internal surface of the bulb.

The bulb temperature increases at high lamp powers. Since, as the temperature increases, the ion mobility in the glass increases and diffusion processes proceed more easily, even relatively small quantities of alkali metal ions are sufficient to interfere with the halogen cycle.

Like the alkali metal ions, water or hydrogen ions also have an adverse effect on the halogen cycle.

For this reason, U.S. Pat. No. 4,163,171 describes an incandescent lamp in which the glass is not only "essentially free from alkali metals", but may also only contain less than 0.03% by weight of water.

U.S. Pat. No. 5,489,558 describes glasses which are suitable in particular for use in flat panel displays. These glasses either have high $Al_2O_3$ contents ($\geq 18\%$ by weight) combined with relatively low $SiO_2$ contents ($\leq 55\%$ by weight) or low $Al_2O_3$ contents ($\leq 13\%$ by weight) combined with higher $SiO_2$ contents ($\geq 55\%$ by weight). The glasses are specifically adapted to a-silicon and polysilicon and are less suitable for Mo. Their viscosity is particularly suitable for the technique of drawing flat glass sheets and less so for that of drawing tubes for producing lamps. The same applies to the glasses which are disclosed by European patent publication 0,672,629 and U.S. Pat. No. 5,508,237.

In order to be used as glass for lamp bulbs which contain molybdenum components as electrode material or electrical lead material, the thermal expansion of the glass must be adapted to that of molybdenum, so that a tight, stress-free seal between the metal and the glass is achieved.

This means that the glass must have a higher expansion coefficient at its setting temperature (set point) than Mo, for example, the difference in expansion between Mo and the glass must be positive, in order to achieve a radial compressive stress in the glass which is beneficial to the sealing of Mo supply leads.

A further demand placed on a glass which is to be suitable for use as glass for lamp bulbs is that it be suitable for tube drawing. For this to be so, it must have sufficient crystallization stability.

SUMMARY OF THE INVENTION

The object of the invention is therefore to provide a glass which can be subjected to high temperatures and which fulfills the above-mentioned demands placed on a material which is to be used for lamp bulbs having bulb temperatures of greater than 650° C.

This object of the invention is realized with a earth-alkaline aluminosilicate glass which has a composition in percent by weight on oxide basis as follows: $SiO_2$ >58–62; $Al_2O_3$ 15–17.5; $B_2O_3$ 0.2–0.7; MgO 0–<1; CaO 5.5–14; SrO 0–8; BaO 6–10; ZrO 0.05–1.0; $CeO_2$ 0–0.3; $TiO_2$ 0–0.5; Br$^-$ 0–0.6 where $\Sigma$ RO 21–24; (MgO+CaO+SrO)/BaO 1.45–1.75; and an alkali metal content of <0.03% by weight and a water content of <0.02% by weight. This aluminosilicate glass which contains alkaline earth metals has a very precisely proportioned ratio between constituents, which vary only within relatively narrow limits, in order to combine all the desired properties.

DESCRIPTION OF THE PREFERRED EMBODIMENTS OF THE INVENTION

The glass according to the invention contains >58 to 62% by weight of $SiO_2$. Lower contents would make the thermal expansion too high, while higher contents would make it too low. In both cases, the glass would not be suitable for Mo, which would result in halogen lamps which leak. Preferably, the range lies between 59 and 61% by weight of $SiO_2$.

The glass contains 15 to 17.5% by weight of $Al_2O_3$. Departures from this range would also lead to incorrectly set coefficients of expansion. Moreover, lower contents would reduce the transformation temperature $T_g$, which would lower the thermal stability of the glass. Contents of between 15.3 and 17.2% by weight are preferred.

Furthermore, the glass contains small quantities of $B_2O_3$, specifically 0.2 to 0.7% by weight. Preference is given to 0.3 to 0.5% by weight. Even in such small quantities, the boron oxide advantageously facilitates melting without excessively reducing the high transformation temperature $T_g$ required.

Moreover, it promotes solubility of a further constituent of the glass, namely $ZrO_2$, which is present in the glass to the extent of 0.05 to 1.0% by weight. In fact, the solubility of ZrO in particular in aluminosilicate glasses which are free of alkali metals would otherwise be extremely limited, and $ZrO_2$ stones and cords would lead to a poor quality of glass. The $ZrO_2$ content in the glass contributes to achieving the desired high transformation temperature $T_g$ of >775° C.

The glass contains alkaline earth metal oxides in specific quantities and in a defined ratio with respect to one another: The BaO content in the glass is 6 to 10% by weight (preferably >6.5–9.5% by weight) and the CaO content in the glass is 5.5 to 14% by weight (preferably 5.9 to 13.5% by weight). Furthermore, the glass may contain up to 8% by weight of SrO. Similarly to BaO, SrO has the effect of increasing the viscosity.

The total content of the said alkaline-earth metal oxides RO is to be no less than 21% by weight and is not to exceed 24% by weight, since otherwise both the thermal expansion coefficient and the viscosity would deviate from the desired values.

The weight ratio between the total amount of CaO and SrO, on the one hand, and BaO, on the other hand, ((CaO+ SrO)/BaO) is to be between 1.45 and 1.75. The glass may in addition contain up to <1% by weight of MgO. Additions of MgO especially to an aluminosilicate glass which contains CaO and BaO may contribute to strengthening of the glass network, because MgO, as a so-called "intermediate oxide", with $Mg^{2+}$ as a cation of higher field strength than $Ca^{2+}$ and $Ba^{2+}$, like $Al_2O_3$ and $SiO_2$, can perform a network-forming function. Even with MgO, the total amount of RO is to lie between 21 and 24% by weight. If MgO is present in the glass, the (CaO+SrO+MgO)/BaO weight ratio is to lie between 1.45 and 1.75. Preferably, the (CaO+SrO)/BaO weight ratio or, in the case of glasses which contain MgO, the (CaO+SrO+MgO)/BaO weight ratio is to lie between 1.65 and 1.75.

In lamps which are subjected to high temperatures, the halogen fill is generally a bromide-containing gas, and impurities from the glass and from the filament, such as for example alkali metal ions, react with the bromide, in this case to form alkali metal bromides which form a white deposit on the inner side of the glass of the bulb. This reduces the halogen concentration in the lamp and interferes with or even causes the failure of the regenerative halogen cycle.

Up to 2% by weight of Br$^-$, which owing to the volatility of the compounds used (e.g. $BaBr_2$) corresponds to approximately up to 0.6% by weight in the finished glass, may now be added to the glass according to the invention. The intention is that this additional bromide is to prevent bromide from being removed from the cycle, thus also preventing the black discoloration caused by tungsten deposits. Furthermore, the bromide has a refining action during production. Moreover, bromide additions make it possible to shift the UV absorption edge of the glass towards shorter wavelengths, making it possible to use the glass as a partially UV-transparent glass. Such glasses are of interest for use in tanning lamps. Thus, in a preferred embodiment, the glass according to the invention contains at least 0.05% by weight of bromide. Contents higher than the upper limit mentioned would not bring about any further increase in the positive effects.

By contrast, $CeO_2$ in the glass has the effect of shifting the UV absorption edge towards longer wavelengths. Moreover, it acts as a refining agent. It has been found that $CeO_2$ reduces the problematic halide deposits on the inside of the bulb, thus also reducing the blackening during operation of the lamp.

For this reason, the glass according to the invention may also contain up to 0.3% by weight of $CeO_2$. Higher contents would cause an interfering yellow discoloration of the glass. In a preferred embodiment, at least 0.04% by weight is present in the glass.

Controlled selection of the contents of both $CeO_2$ and bromide in the glass makes it possible to shift the UV absorption edge back towards that of the undoped glass.

Furthermore, the glass may additionally contain up to 0.5% by weight of $TiO_2$. This component also shifts the UV edge towards the longer-wavelength spectral range, although to a lesser extent than $CeO_2$. Owing to $TiO_2$, reacting with iron impurities to form a colored iron titanate compound, higher contents would give the glass a brownish appearance, so that it would no longer be suitable as a lamp glass.

As has already been mentioned above, the alkali metal oxide content and the water content are also of considerable importance.

The higher the operating temperatures of the lamp, the greater the demands placed on a very low content become. In the case of the glasses according to the invention, which are suitable for use as material for lamp bulbs having bulb temperatures of approx. 700° C., the alkali metal oxide content is to remain limited to less than 0.03% by weight and the water content to less than 0.02% by weight. As a result, owing to the complete, precisely proportioned composition, in particular the ratios between the alkaline earth metals, the black discoloration is reduced even at the high temperatures mentioned above and after prolonged operation of the lamp.

The alkali metal content can be kept at a low level by using raw materials with a low alkali metal content and by ensuring clean conditions during preparation of the batch and in the dog-house of the melting end.

The water content too can be kept sufficiently low by suitably selecting the raw materials and the melting conditions.

EXAMPLES

To produce the glasses of the examples, in each case raw material variants with a low alkali metal content were used for the oxide components, such as for example silica sand, aluminum oxide, magnesium carbonate, calcium carbonate and barium carbonate, as well as zircon sand. Furthermore, if desired cerium oxide and barium bromide were added. The well homogenized batch was melted in the laboratory in a Pt/Rh crucible at 1600–1650° C., refined and homogenized. The glass was then pulled vertically in a laboratory tube-pulling appliance. The glasses were free of undesired crystals.

Table 1 shows five examples of glasses according to the invention (A) and one comparative example (V1), including their compositions (in % by weight based on oxide) and their significant properties:

In addition to the transformation temperature ($T_g$) and the temperature at a viscosity of $10^4$ dPas ($V_A$), the reboil temperature is also indicated. This is the temperature at which a glass specimen which is bubble-free on visual inspection at room temperature suddenly reveals the formation of bubbles at the interface with a metal (specimen holder, Mo) when the temperature is raised. The higher this reboil temperature lies, the less the glass tends to form bubbles when fused to Mo. In the comparative example, the annealing point (AP) is shown instead of $T_g$.

Furthermore, the coefficient of thermal expansion $\alpha_{20/300}$ is shown, as is $\tau_{80}$ for three examples. The $\tau_{80}$ value indicates the wavelength at which the light transmission for a glass specimen thickness of 1 mm is 80%.

The maximum crystal growth rate $KG_{max}$ and the upper devitrification temperature UDT (liquidus temperature) were determined for the Example A1. The results $KG_{max}=$ 0.16 μm/min and UDT=1245° C. (60 K under $V_A$) document the good stability as to crystallization of the glasses according to the invention.

For a lamp test, high-power tungsten/halogen lamps were produced from the glass tubes in the standard way. These lamps were subjected to long-term operation at a bulb temperature of 700° C. The time taken until the beginning of blackening on the inside of the glass bulb was determined. In the case of A1, this time was 140 h, and in the case of A2 it was 75 h. A3–A5 are also satisfactory. In the case of V1, the bulb began to bulge.

In addition to the comparative example V1 listed in Table 1, other example glasses were also produced, differing from Example A1 only by a higher (excessive) water content (V2) and by a higher (excessive) alkali metal content (V3):

In the lamp test described above, V2, containing 0.028% by weight $H_2O$, exhibited black discoloration even after 25 h. V3, containing 0.09% by weight of $Na_2O$ and 0.01% by weight $K_2O$, exhibited black discoloration even after less than 25 h.

Table 1

Exemplary Embodiments (A) and Comparative Example (V1)
Compositions of the glasses (in % by weight) and their significant properties

|  | A1 | A2 | A3 | A4 | A5 | V1 |
|---|---|---|---|---|---|---|
| $SiO_2$ | 60.7 | 60.7 | 60.7 | 60.7 | 59.4 | 56.8 |
| $Al_2O_3$ | 16.5 | 16.5 | 16.5 | 16.5 | 16.5 | 16.4 |
| $B_2O_3$ | 0.3 | 0.3 | 0.3 | 0.3 | 0.5 | 4.7 |
| MgO | — | — | — | — | — | 5.8 |
| CaO | 13.5 | 13.5 | 13.5 | 13.5 | 8.5 | 7.8 |
| SrO | — | — | — | — | 5.0 | — |
| BaO | 8.0 | 8.0 | 8.0 | 8.0 | 9.1 | 8.0 |
| $ZrO_2$ | 1.0 | 1.0 | 1.0 | 1.0 | 1.0 | — |
| $CeO_2$ | — | — | — | 0.1 | — | — |
| $Br^-$ | — | — | 0.12 | — | — | — |
| $Na_2O$ | 0.02 | 0.02 | 0.017 | 0.022 | 0.02 | 0.028 |
| $K_2O$ | 0.006 | 0.009 | 0.005 | 0.007 | 0.007 | 0.018 |
| $H_2O$ [% by weight] | 0.0122 | 0.002 | 0.007 | 0.007 | 0.01 | 0.017 |
| $\alpha_{20/300}$ [$10^{-6}$/K] | 4.72 | 4.82 | 4.68 | 4.59 | 4.72 | 4.52 |
| $T_g$ [°C.] | 794 | 790 | 795 | 802 | 790 | 721 (AP) |
| $V_A$ [°C.] | 1305 | n.d. | n.d. | n.d. | 1330 | n.d. |
| Reboil temp. [°C.] | 1500 | 1566 | 1453 | 1515 | 1490 | n.d. |
| $\tau_{80}$ | 350 | n.d. | 340 | 357 | n.d. | n.d. | n.d. = not determined

In the lamp test, the glasses according to the invention, which have coefficients of thermal expansion $\alpha_{20/300}$, of between $4.3 \cdot 10^{-6}$/K and $4.95 \cdot 10^{-6}$/K and transformation temperatures $T_g$ of greater than 775° C., again reveal their high thermal stability and their suitability for use as material for lamp bulbs having bulb temperatures of approx. 700° C. Their resistance to reboiling is documented by reboil temperatures of at least 1450° C.

It is understood that the foregoing description is that of the preferred embodiments of the invention and that various changes and modifications may be made thereto without departing from the spirit and scope of the invention as defined in the appended claims.

What is claimed is:

1. An aluminosilicate glass composition containing alkaline earth metals, said glass composition being for lamp bulbs which have molybdenum components with bulb temperatures of greater than 650° C., said glass composition comprising in percent by weight on oxide basis:

$SiO_2$ >58–62

$Al_2O_3$ 15–17.5

B$_2$O$_3$ 0.2–0.7
CaO 5.5–14
SrO 0–8
BaO 6–10
ZrO$_2$ 0.05–1
CeO$_2$ 0–0.3
TiO$_2$ 0–0.5
Br$^-$ 0–0.6
where
Σ RO 21–24
(CaO+SrO)/BaO 1.45–1.75
and an alkali metal oxide content of <0.03% by weight and a water content of <0.02% by weight.

2. The glass composition of claim 1, comprising in percent by weight on oxide basis:

SiO$_2$ 59–61
Al$_2$O$_3$ 15.3–17.2
B$_2$O$_3$ 0.3–0.5
CaO 5.9–13.5
SrO 0–8
BaO>6.5–9.5
ZrO$_2$ 0.05–1
CeO$_2$ 0–0.3
TiO$_2$ 0–0.5
Br$^-$ 0–0.6
where
Σ RO 21–24
(CaO+SrO)/BaO 1.45–1.75
and an alkali metal oxide content of <0.03% by weight and a water content of <0.02% by weight.

3. The glass composition of claim 1, wherein said glass additionally contains up to <1% by weight of MgO, and in that the total RO is 21–24% by weight and the (MgO+CaO+SrO)/BaO weight ratio is 1.45–1.75.

4. The glass composition of claim 1, wherein the (MgO+CaO+SrO)/BaO weight ratio is 1.65–1.75.

5. The glass composition of claim 1, wherein said glass contains at least 0.5% by weight of Br$^-$.

6. The glass composition of claim 1, wherein said glass contains at least 0.04% by weight of CeO$_2$.

7. The glass composition of claim 1, wherein said glass has a coefficient of thermal expansion $\alpha_{20/300}$ of between $4.3 \cdot 10^{-6}$/K and $4.95 \cdot 10^{-6}$/K, a transformation temperature $T_g$ of greater than 775° C. and a reboil temperature of at least 1450° C.

8. The glass of claim 1, wherein said glass can have temperatures of greater than 650° C. when said glass is a bulb material for lamp bulbs.

* * * * *

UNITED STATES PATENT AND TRADEMARK OFFICE
CERTIFICATE OF CORRECTION

PATENT NO. : 6,069,100
DATED : May 30, 2000
INVENTOR(S) : Karin Naumann, Franz Ott and Otmar Becker It is certified that error appears in the above-identified patent and that said Letters Patent is hereby corrected as shown below:

On the title page, in the title [54]: delete "LAMB" and substitute -- LAMP -- therefor.

In column 1, line 1: delete "LAMB" and substitute -- LAMP -- therefor.

In column 3, line 59: delete "ZrO" and substitute -- $ZrO_2$ -- therefor.

In column 6, line 36: delete "$Na_{2O}$" and substitute -- $Na_2O$ -- therefor.

Signed and Sealed this

First Day of May, 2001

Attest:

Attesting Officer

NICHOLAS P. GODICI

Acting Director of the United States Patent and Trademark Office